US009468046B2

(12) United States Patent
Barnetson et al.

(10) Patent No.: US 9,468,046 B2
(45) Date of Patent: Oct. 11, 2016

(54) HYBRID POWER ARCHITECTURE FOR CONTROLLING A LIGHTING SYSTEM

(71) Applicant: Lunera Lighting, Inc., Anaheim, CA (US)

(72) Inventors: Donald Barnetson, San Jose, CA (US); John X Zhang, Walnut Creek, CA (US)

(73) Assignee: LUNERA LIGHTING, INC., Santa Clara, CA (US)

( * ) Notice: Subject to any disclaimer, the term of this patent is extended or adjusted under 35 U.S.C. 154(b) by 425 days.

(21) Appl. No.: 13/947,057

(22) Filed: Jul. 20, 2013

(65) Prior Publication Data

US 2015/0021988 A1 Jan. 22, 2015

(51) Int. Cl.

| | |
|---|---|
| ***H02J 9/00*** | (2006.01) |
| ***H02J 3/00*** | (2006.01) |
| ***H05B 33/08*** | (2006.01) |
| *H02J 9/06* | (2006.01) |

(52) U.S. Cl.
CPC ........... *H05B 33/0803* (2013.01); *H02J 9/061* (2013.01); *Y10T 307/344* (2015.04)

(58) Field of Classification Search
CPC ..... H05B 31/00; Y10T 307/344; H02J 9/061
USPC .......................................................... 307/23
See application file for complete search history.

(56) References Cited

U.S. PATENT DOCUMENTS

| | | | |
|---|---|---|---|
| 5,321,600 A | 6/1994 | Fierheller | |
| 5,532,918 A | 7/1996 | Mayrand et al. | |
| 5,563,781 A | 10/1996 | Clauter et al. | |
| 5,572,416 A | 11/1996 | Jacobs et al. | |
| 5,587,895 A | 12/1996 | Harkins | |
| 5,661,645 A | 8/1997 | Hochstein | |
| 5,910,891 A | 6/1999 | Jo | |
| 6,078,148 A | 6/2000 | Hochstein | |
| 2010/0271802 A1* | 10/2010 | Recker | H05B 33/0803 362/20 |
| 2011/0133655 A1* | 6/2011 | Recker | H02J 9/02 315/159 |
| 2012/0080944 A1 | 4/2012 | Recker | |
| 2012/0262093 A1 | 10/2012 | Recker | |
| 2015/1121988 | 1/2015 | Barnetson | |

* cited by examiner

*Primary Examiner* — Hal Kaplan
(74) *Attorney, Agent, or Firm* — Henry J. Cittone; Cittone & Chinta LLP

(57) ABSTRACT

A hybrid power architecture for lighting system that physically separates the conversion of AC-DC constant voltage power from the conversion of DC-DC constant current needed to drive the LEDs. The hybrid power architecture comprises a power converter to generate DC volt power, a battery backup unit for providing backup in the event of power failure and control architecture for controlling the intensity of the lighting system.

19 Claims, 4 Drawing Sheets

HYBRID POWER ARCHITECTURE FOR CONTROLLING A LIGHTING SYSTEM

FIELD OF THE INVENTION

The present application relates to an apparatus for providing power to LED fixtures, and more particularly to a hybrid power architecture for LED based devices primarily used for illumination purposes.

BACKGROUND

Conservation and management of electrical power are a growing concern with regard to both cost and environmental impact. Lighting represents approximately one-third of electricity use in commercial buildings and more than one-half in lodging and retail. Commercial general lighting (troffers, linears and similar fixtures) light over 60% of the floor space in the US. Therefore lighting systems seem to have the largest potential of any known system to reduce the energy use.

To address the issue of energy conservation, the use of energy efficient light emitting diodes (LEDs) for illumination is beginning to emerge as a lighting source. Apart from being energy efficient, LED lights have a long life, are durable and operate over a wide temperature range. Light emitting diode (LED) arrays are becoming more common in many applications as they are used to replace less efficient incandescent lamps.

While replacing the conventional light with LEDs leads to substantial amount of energy saving, other factors such as turning off the lights when not needed can be used as an option for saving the light energy. The requirement of light in an establishment depends on numerous factors including application, site orientation and occupation, building design, interior reflectances, occupant behavior, and tuning and configuration during installation and commissioning, As a result, there is significant interest in reducing lighting energy use through more efficient lighting systems, including controls. Electrical utilities and building codes are increasingly mandating that occupancy, daylight harvesting, demand response and other controls be included in new construction and retrofit projects.

The electrical power for LED is obtained from AC mains (120/277V AC, 60 Hz) feed in to a power converter that converts the alternating line voltage to DC, or pulsing DC, for powering the plurality of LEDs. Whereas the control equipments operate on a DC constant voltage in the range of 10-24 V DC. Therefore for installing LED fixtures and the control equipments, separate wiring has to be framed in the building architecture resulting in enhancement in the erection and commissioning state.

The cost associated with the purchasing and installing the lighting fixtures in a building is very high; which is further increased when controls are wired along with the lighting fixtures. Further addition of emergency lighting controls in the lighting system increase the cost to a significant amount. Thus the total cost per square feet for commissioning the control equipments is very high.

Therefore in view of aforementioned limitations, the present invention provides an apparatus that reduces the fixture installation cost by simplifying the wiring and reducing the safety hazard such that a less skilled, lower cost workforce can install the product; to provide the controls wiring as standard with the fixture and to provide the emergency power function with minimal incremental cost (primarily the cost of the batteries).

BRIEF SUMMARY OF THE INVENTION

The present disclosure provides a power supplying unit for LED fixtures, troffers or linear fittings that include a power converter to convert class-1 power input to Class-2 power output and a DC constant voltage source to keep the power illuminated in case of power failure. A control element for controlling the intensity of light depending on the requirement of light, thus providing intelligence to the fixture is also connected through the power supplying unit. In one aspect, the present disclosure provides a power supplying unit to the LED fixtures where the control signals are distributed using the class-2 in a multi-conductor class-2 cable, thus reducing the installation cost by only requiring the cable to be pulled between the power supplying unit and the LED fixture, transmitting both control and power signals coherently. Furthermore the transmission of power in class 2 standard means that the maximum power to be transmitted is limited to 100 VA, which is not lethal as compared to convention class 1 120/277V AC. Therefore the installation can be done by a less trained, lost cost labor force, reducing the installation cost significantly.

The power supplying unit comprising: (a) a high efficiency AC to DC converter to convert an 100V-277V AC input to a class-2 level (<60V, <100 VA) DC output; (b) a battery to provide backup in an event of power outage; (c) a battery charging circuit; (d) a boost circuit to boost battery output in the event of power outage; (e) a plurality of control sensors that send a signal pertaining to the light requirement to the power supplying unit; (f) a circuit to generate a battery On control signal in the event of power outage; (g) a multi-conductor class-2cable to transmit the class-2 level DC output; the signal of the control sensor and the Battery On control signal to the LED luminaire; (h) a DC to DC converter to vary the current output; (i) a controller placed with the DC to DC converter that interprets the Battery On control signal and the signal received from the control sensor and instructs the DC to DC converter to dim the current output.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE EMBODIMENTS

Figure 1:
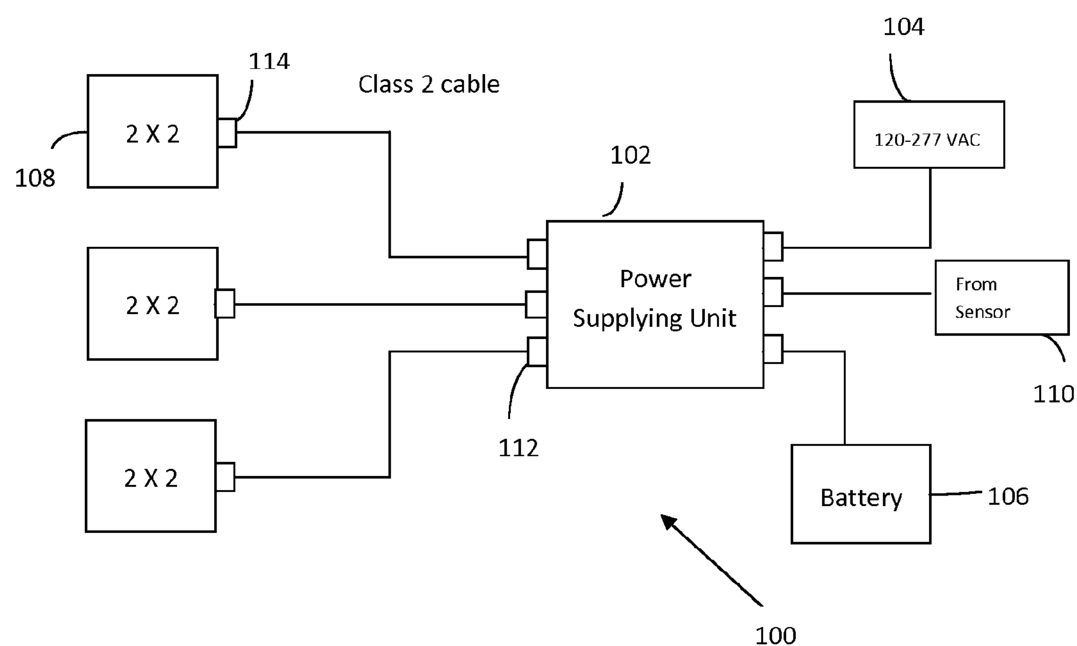
FIG. 1 illustrates a hybrid power architecture for providing power signal and control signals to the LED luminaire, in accordance with an embodiment of the present invention.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention provides a hybrid power architecture to drive a LED fixture, troffer or a linear comprising a high efficiency AC to DC power converter that converts the class-1 AC input (100V-277V) to Class-2 DC output (<60V, <100 VA); a battery backup to provide constant DC voltage source; and a control element to control the intensity of illumination of the LED. The hybrid power architecture physically separates the conversion of AC-DC constant voltage power from the conversion of DC-DC constant current that is needed in order to drive the LEDs. The DC constant voltage is provided with a battery backup that continues to provide the voltage source and keep the LED illuminated in the event of a power failure and an intelligent system that automatically dims the LEDs to a reduce level (approximately 10%) when operating in battery mode. By centralizing the battery backup function, the cost associated with the power architecture is greatly reduced than providing battery backup at each lighting fixture.

In an aspect of the present invention, a separate DC-DC constant current and controls element is included in the hybrid power architecture, thus providing intelligence in the fixture at minimal cost.

The output from the power architecture is less than 60 V DC, <100 VA, thus limiting the output to class-2. The DC voltage power and the control signal is thus current limited and is distributed under class-2 power regulations which do not require the use of conduit and do not require licensed electricians do the installation. The DC voltage power and the control signals are distributed with class-2 cable, for instance ca. 5e or cat 6 standard cables. This will eliminate the need of pulling the multiple wires as a single cable is used to transmit the DC voltage power and the control signal from the power supplying unit to the LED fixtures.

In an aspect of the present invention a hybrid power architecture for providing a power signal and a control signal to a LED fixture is provided, the said hybrid power architecture comprises a power supplying unit having a high efficiency AC-DC power supply in the range of 400 W with a universal (100V-277V) input and class-2 level (<60V, <100 VA) output, a battery charging circuit, a boost circuit to boost battery output to the system DC level in the event of a power outage, a signal line to indicate to the fixtures whether the system is operating on battery or on main AC supply and generates a battery backup signal; a sensor to collect the light requirement data and providing the sensor signals to the power supplying unit; a multi-conductor standard class-2 cable to carry the power signal, battery backup signal and sensor signal from the power supplying unit to the LED fixture; a controller mounted at the LED fixture that is capable of terminating the controls architecture by decoding the sensor signal and battery backup signal to determine the appropriate current level to the LED array and automatically dimming the LED fixture down to approximately 10 percent of its nominal output during battery operation so as to support the required 90 minute battery operation.

In another aspect of the present invention a class-2 limiting circuit is provided on the output DC power voltage signal to limit the power on each of the output to the maximum allowed under class-2 guidelines (100 VA), to isolate, indicate and recover from over-current scenarios.

FIG. 1 illustrates a hybrid power architecture for providing power signal and control signals to the LED luminaire, in accordance with an embodiment of the present invention. Referring FIG. 1 the hybrid power architecture 100 comprises a power supplying unit 102 connected to an AC voltage main supply 104 and a battery 106. The AC voltage main supply 104 provides AC voltage to the power supplying unit 102 in range of 100-277 V with a wattage capacity of 400 Watt. The power supplying unit 102 consists of an AC to DC power converter that converts the 100 V-277 V AC input to class-2 level DC output i.e. less than 60V DC output. The hybrid power architecture 102 further comprises a plurality of sensors 110 located in the building. The battery 106 provides a backup of DC constant voltage to continuously provide the voltage to the plurality of LED luminaires 108 in the event of power failure and generates a battery backup signal that signifies the current operation of system on battery mode. The sensor 110 senses the building parameters for calculating the required intensity of light in the building, the parameters include occupancy level, daylight harvesting, temperature, humidity and the sound level. The sensor 110 provides the input in form of DC signal to the power supplying unit 102. The output 112 of the power supplying unit 102 is connected to the plurality of LED luminaires 108 through class-2 cable such as cat5e cable or cat6 cable. The output 112 is meant for providing multiple signals and is adaptable to receive RJ45 connector. The multiple signals of the output 112 consist of class-2 power signal (less than 60 V DC, <100 VA), the battery backup signal and the signal received from the sensor 110 located in the building. The class-2 output cable is connected to a controller 114 mounted on each of the LED luminaires 108, the controller 114 intercepts the sensor signal and the battery backup signal and carries the current to the LED luminaire 108.

In an aspect of the present invention, the controller 114 adjusts the current output to LED luminaire in range of 10 percent to 99 percent.

In another aspect of the invention, the output 112 is current limited and distributed under class-2 power regulations that do not require the use of conduit in the plenum, therefore it eliminates the requirement of licensed electricians to do the installation.

Figure 2:
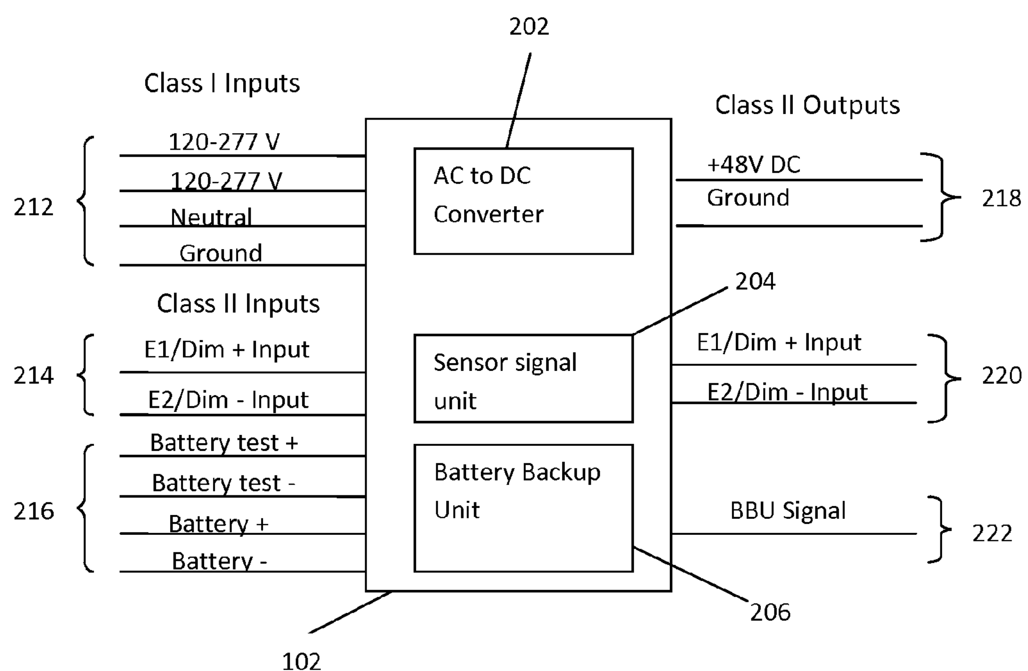
FIG. 2 shows a power supplying unit of the hybrid power architecture with inputs and outputs, in accordance with an embodiment of the present invention.

FIG. 2 shows a power supplying unit of the hybrid power architecture with inputs and outputs, in accordance with an embodiment of the present invention. The power supplying unit 102 contains multiple chambers: an AC to DC converter 202 for conversion of AC volt to DC volt, a sensor signal unit 204 for providing the signal 214 received from sensor for controlling the intensity of light, and a battery backup unit 206 to provide constant DC voltage source to the LED light in the event of power outage. There are two types of input to the power supplying unit 102. Class-1 input consists of a 120-277 V AC main supply 212 having phase wire, neutral wire and a ground wire and requires the use of conduit in the plenum for the transmission of wires. The AC main 212 is supplied to the AC to DC converter 202 that converts the 120-277 V class-1 AC supply into the class-2 level (<60V, <100 VA) DC output. Class-2 input to the power supplying unit 102 comprises the sensor signal 214 from the sensor 110 present in the building. In an aspect of the present invention, the sensor 110 is used to calculate the required intensity of light in a building. The sensor 110 sends the 10V DC signal 214 to the sensor signal unit 204 which then transmits it as sensor output signal 220 from the power supplying unit 102. The power supplying unit 102 is connected with a battery 106 through a battery connection line. In case of power outage or in case of termination of AC power line 212, the battery backup unit 206 gets activated and provides a DC constant voltage so that the power supply to the LED luminaire 108 does not get interrupted. The input from the battery 106 is routed through a battery backup unit 206 which converts the DC constant voltage from the battery 106 to class-2 DC volt (<60 V, <100 VA). While the DC constant volt is supplied from battery 106, the battery backup unit 206 generates a Battery backup unit signal 222 of 10 V DC. The battery backup unit signal 222 informs the LED luminaire 108 that the power is being supplied from the Battery 106. The controller 114 mounted at the LED luminaire 108 detects the battery backup unit signal 222 and automatically dim the LED luminaire by varying the current. In an aspect of the present invention, the current is varied by 90 percent of the actual intensity, and thus on the event of power failure the intensity of the LED luminaires is dimmed to approximately 10 percent of the nominal value.

In an aspect of the present invention, the output from the power supplying unit 102 is current limited and is under the regulations of class-2 power distributions. The output signal: the power output 218, the sensor output signal 220 and the battery backup unit signal 222 is then transmitted through a multi-conductor class-2 cable such as cat 5 or cat 6 cable. This provides the co-bussing of sensor signal 220 with the power output 218 in same class-2 multi-conductor cable.

Figure 3:
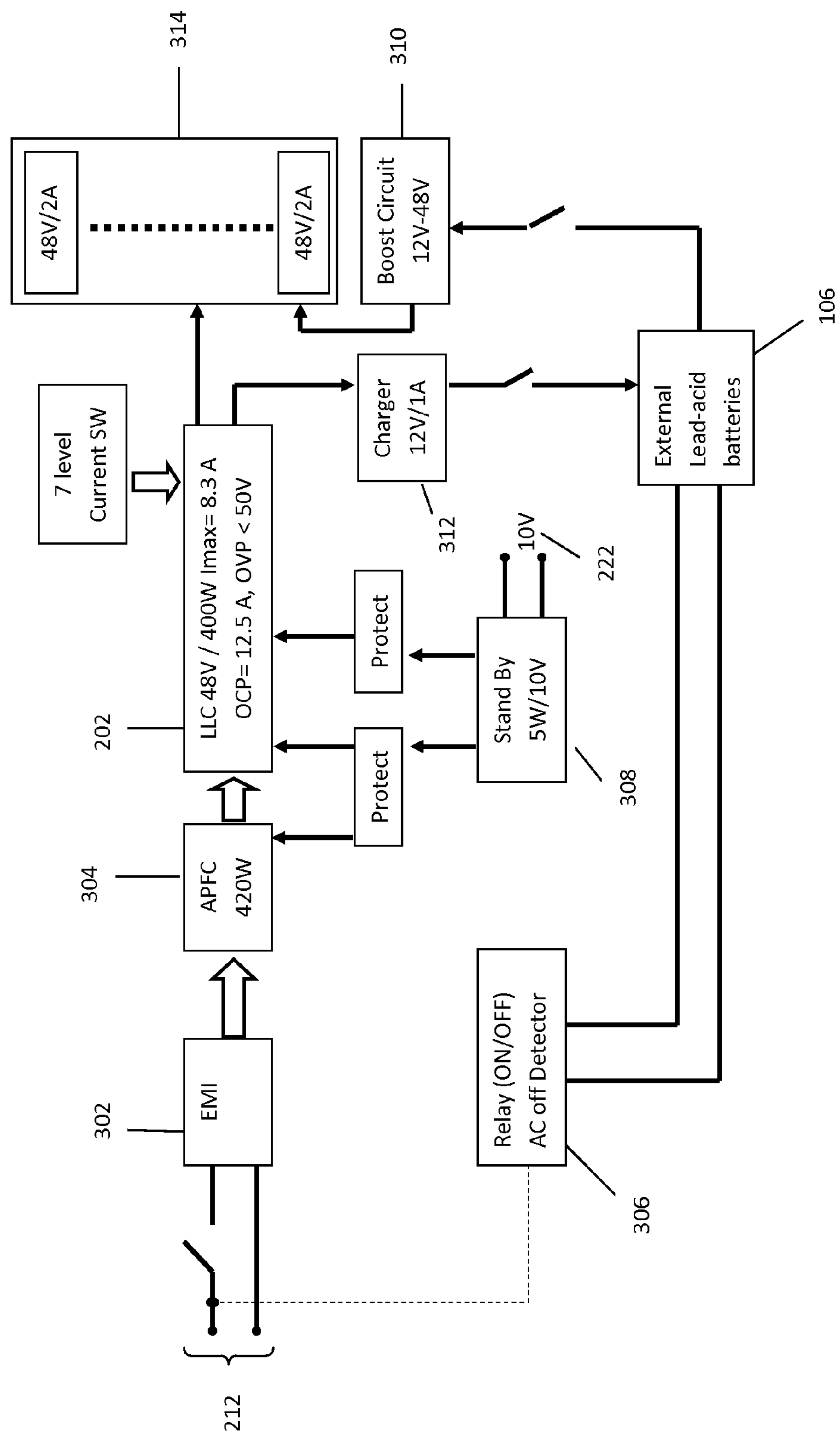
FIG. 3 is a schematic representation of system component of a power supplying unit in accordance with an embodiment of the present invention.

FIG. 3 is a schematic representation of system component of a power supplying unit in accordance with an embodiment of the present invention. The AC main power 212 is supplied to the power supplying unit 102 which is then passed through EMI shielding unit 302 to reduce the electromagnetic interference. The filtered AC Volt supply is passed through Automatic power factor control panel 304 for the improvement of power factor. The improved power factor AC voltage signal is then feed to the AC to DC converter 202 which converts the AC power into DC volt supply with low level current output of 48V/400 watt with maximum current Imax of 8.3 A. A battery backup is also provided in the power supplying unit 102 such that the battery 106 will provide the backup power in the event of power outage. The battery 106 can be an externally connected to the power supplying unit 102 or it can be present internally as a function of power supplying unit. A switch relay 306 is connected to the AC main line 212 such that the Relay 306 remains in ON stage as long as the AC main line power 212 is continuous. In case of power outage or failure, the relay 306 gets switched off and the external circuit connects battery 106 to the AC power line resulting in constant supply of DC volt supply. In the event of power outage and initiation of battery backup, a standby unit 308 starts generating 10V DC voltage signals that serve as battery backup unit signal 221 implying that the power supplying unit 102 is working on the battery backup. A battery charger 312 of capacity 12V/1 A is connected to the AC to DC converter 202 for charging the battery 106. A boost circuit 310 converts the battery 106 output to the power supplying unit 102 DC output level, i.e. 12V to 48V. The AC to DC converter output, the battery backup unit signal 222 and the sensor output signal 220 are fed in to a multiple port output 314 present in the power supplying unit 102. The multiple output port 314 of the power supplying unit is adaptable to receive RJ45 connector.

In an aspect of the present invention, a class-2 limiting circuit is provided on each port of the multiple port output 314 so as to limit the output power 218 to the maximum permissible under class-2 guidelines.

Figure 4:
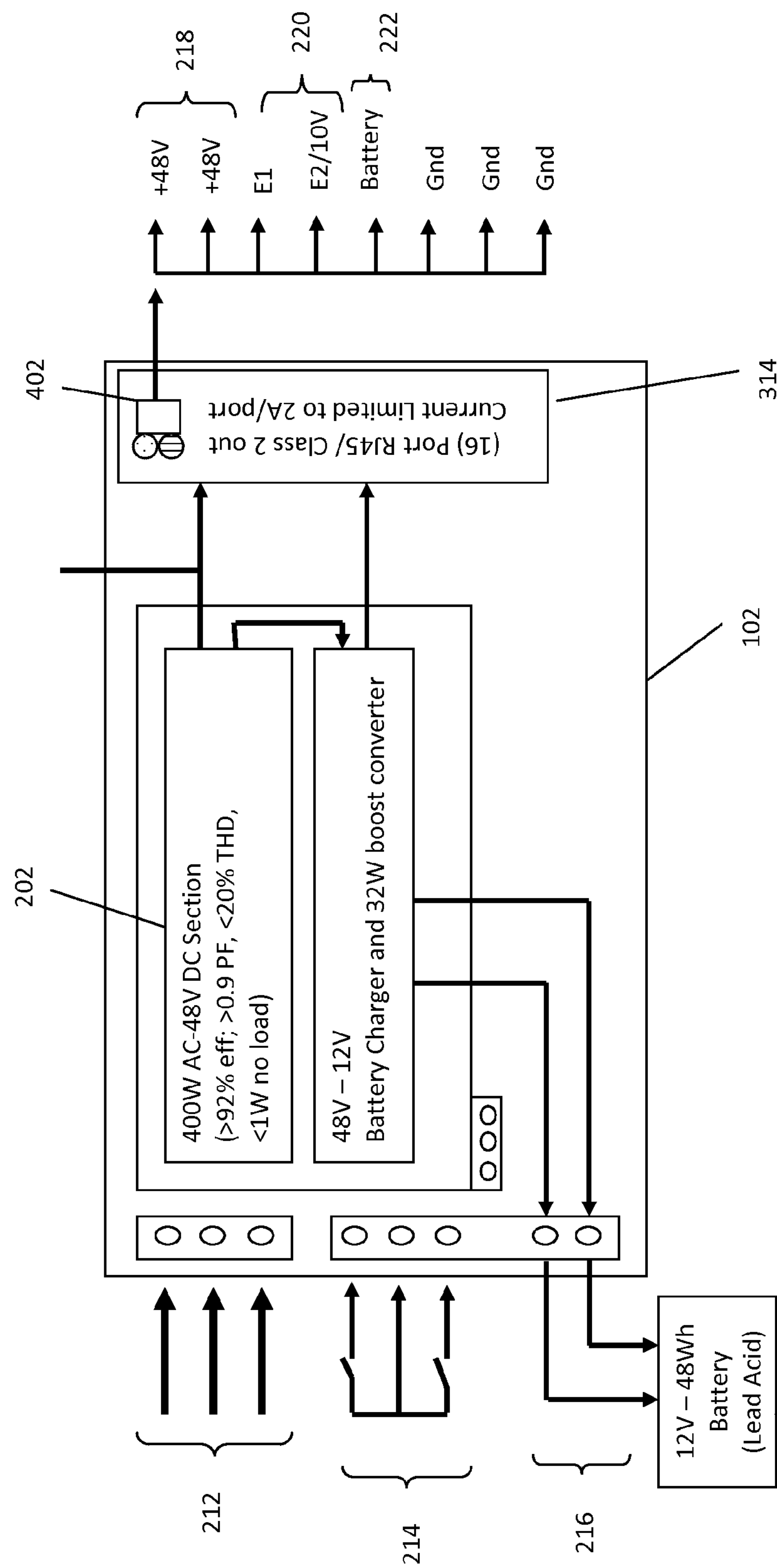
FIG. 4 illustrates a circuit diagram of the Power supplying unit, in accordance with an embodiment of the present invention.

FIG. 4 illustrates a circuit diagram of the Power supplying unit, in accordance with an embodiment of the present invention. Referring FIG. 4, the AC power 212 is fed into the power supplying unit 102 having AC to DC converter 202 which converts the 120V-277 V AC into 48 V DC. The output of the AC to DC converter 202 is supplied to the battery charger 312 and the boost circuit 310 that boosts battery output to the 12V-48V DC in the event of power failure. The battery 106 is connected to the battery charger 312 and the boost circuit 310 through line 216. The output of the AC to DC converter 202 and the battery 106 is feed in to the multi pot output 314 present in the power supplying unit 102. The sensor signal meant for calculating the required intensity of light is introduced in the power supplying unit 102 through line 214. The output for the senor is also sourced to the multi port output 314 in the power supplying unit 102. Each port 402 of the multiport output 314 is having 8 pins and is adaptable to receive RJ45 connector. The pin in the port provides DC voltage power signal 218 of 48 volt, E1 and E2/10V signal 220 received from sensor 110 for controlling the intensity of illumination, and a battery backup unit signal 222 of 10V. The port 402 of the power supplying unit 102 provides the co-bussing of power signal 218, sensor signal 220 and the battery backup signal 222. The port 402 of power supplying unit 102 is connected to the LED luminaire 108 through a class-2 multi-conductor cable such as cat5 or cat6 cable. The 48 V power signal 218 is used to light the LED luminaire 108. The sensor signals 220 are passed to the controller 114 mounted on the LED luminaire and the controller 114 controls the intensity of LED light by variably adjusting the amount of current. The battery backup unit signal 222 of 10V is supplied to the controller 114 and the controller 114 dims the LED light to 90 percent by limiting the current by 90 percent. The 90 percent reduction in the illumination while the LED luminaire 108 is on the battery backup will ensure 90 minutes back up of the battery 106 when the LED luminaire 108 is on battery supply.

In an aspect of the present invention each port 402 on the multipart output of the power supplying unit 102 is provided with two indicator lights. The first indicator light indicates the positive connection and ensures the proper connection in the output signal. The second indicator light is present for detecting any fault in the output line. In case of fault, the fault gets automatically corrected within few seconds.

We claim:

1. A hybrid power architecture for controlling a lighting network in an area comprising:

a plurality of LED luminaires;

a controller mounted on the plurality of LED luminaires for varying the current input to the LED luminaires;

a power supply unit having a power converter for generating a DC voltage power, a battery connected to the power supply unit, a battery charging circuit, and a boost circuit to boost battery output and to generate a backup signal in the event of power outage; and a multi-conductor cable to transfer the DC voltage power, the backup signal and a sensor signal to the controller on the plurality of LED luminaires.

2. The hybrid power architecture of claim 1 wherein the controller varies the current in range of 1% to 100%.

3. The hybrid power architecture of claim 1 wherein the DC voltage power generated by the power converter is less than 60 Volts DC.

4. The hybrid power architecture of claim 1 wherein the power converter is fed with 120V-277V AC power.

5. The hybrid power architecture of claim 1 wherein the battery can be connected externally or internally.

6. The hybrid power architecture of claim 1 wherein the boost circuit boosts the battery output to 12V-48V DC in the event of power outage.

7. The hybrid power architecture of claim 1 wherein the backup signal generated by the boost circuit is 10V DC signal.

8. The hybrid power architecture of claim 1 wherein the multi-conductor cable is Cat5 or cat6 cable.

9. The hybrid power architecture of claim 1 wherein the controller varies the current to 10 percent on receiving the backup signal.

10. The hybrid power architecture of claim 1 wherein the sensor signal reflects the intensity of light required.

11. A power supply unit for sending power and a dimming control signal to a lighting system comprising:

an input port to receive AC main supply, and a line for connecting a battery;

a power converter to convert power from the AC main supply into a DC voltage power, wherein the DC voltage power is used to illuminate the lighting system;

a relay switch connected to the AC main supply such that the relay switch activates a battery power in the event of AC main supply failure;

a battery backup unit to generate a control signal when a system is on the battery power;

a charger to charge the battery;

a boost circuit to boost battery output to the DC voltage power; and a multi-port outlet for outputting the DC voltage power, and the control signal, wherein each port of the multi-port outlet is adaptable to receive class 2 multi-conductor cable.

12. The power supply unit of claim 11 wherein the power supplying unit further comprises means for reducing electromagnetic interference.

13. The power supply unit of claim 11 wherein the power supplying unit further comprises means for automatic power factor control.

14. The power supply unit of claim 11 wherein the control signal determines the intensity of light required in the area.

15. The power supply unit of claim 11 wherein the DC voltage power is in range of 12V to 48V DC.

16. The power supply unit of claim 11 wherein the control signal is 10 Volt DC signal.

17. The power supply unit of claim 11 wherein each port of the multi-port outlet is adaptable to receive RJ45 connector.

18. The power supply unit of claim 11 wherein the multi-port outlet outputs the DC voltage power and a sensor signal.

19. The power supply unit of claim 11 wherein each port on multi-port outlet has two indicators for fault detection and positive connection detection.

* * * * *